Figure 1:
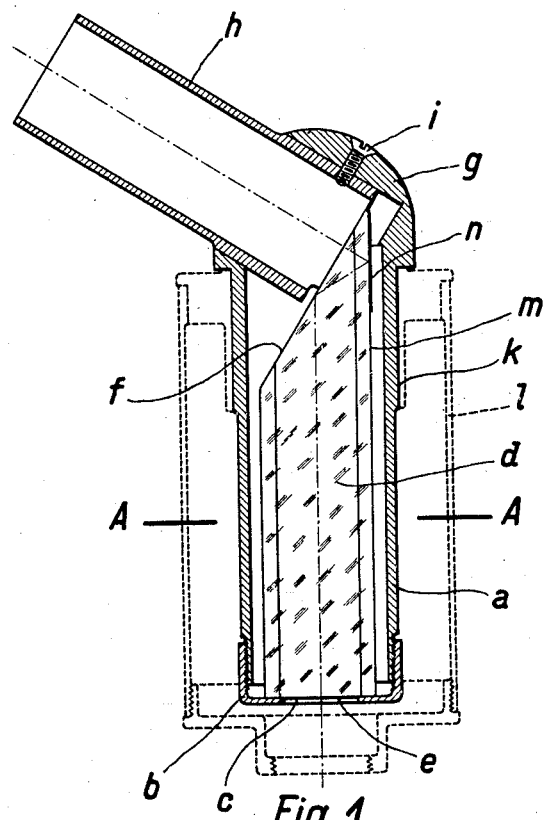

July 17, 1934.    W. BAUERSFELD    1,966,784
OCULAR TUBE ATTACHMENT FOR MONOCULAR MICROSCOPES Filed May 11, 1933

Inventor:

Walther Bauersfeld.

Patented July 17, 1934

1,966,784

UNITED STATES PATENT OFFICE 1,966,784

OCULAR TUBE ATTACHMENT FOR MONOCULAR MICROSCOPES

Walther Bauersfeld, Jena, Germany, assignor to firm Carl Zeiss, Jena, Germany

Application May 11, 1933, Serial No. 670,473
In Germany May 12, 1932

4 Claims. (Cl. 88—39)

I have filed an application in Germany, May 12, 1932.

When examining liquid objects with a microscope, it is not possible, as a rule, to incline the stage, because the object would flow away from the field of view. To take advantage of an inclined viewing direction and overcome the said inconvenience, the suggestion has been made to so construct the ocular tube attachment of the microscope as to make it bend the path of the imaging rays by means of a reflecting system, the microscope tube and the object stage being vertical and horizontal, respectively. However, this solution is not very advantageous, since the necessity of placing the reflecting system in the path of the rays and of preventing the tube, even when assuming its lowest position, from touching the stand with its ocular part proper entails a comparatively great height of the microscope, the consequence being that microscoping is not very agreeable and, moreover, that the optical length of the tube must needs be increased relatively to the tube length upon which the correction of microscope objectives is based by general agreement. The simplest way to avoid this disadvantage is to add to the reflecting system a glass body which may be traversed by the ray path without a refraction taking place, this glass body extending into the microscope tube. The path of the rays in this glass body corresponds to a shorter ray path in air. The glass body may be given such a length that the said increase of the optical tube length is compensated so as to correspond to a ray path that is equal to the usual one in air. By making this glass body extend into the microscope tube, the ocular tube attachment will protrude from the microscope not more than usual.

The invention consists in simplifying the construction of the ocular tube attachment and reducing the number of the minutely worked surfaces that are to reflect and to provide a passage for the rays. This simplification is possible when, according to the invention, the reflecting system and the additional glass body are combined to form an integral prism body, at least one of those surfaces of this body which are not traversed by the ray path being reflective and parallel to the direction of the entering imaging rays. By constructing the ocular tube in this manner, the number of optically effective surfaces is reduced by two. In order to make the prism body permanently assume its correct position, it is conveniently held at those of its two surfaces which are traversed by the rays and at some of its edges in which its other surfaces intersect. The prism body will be held in an especially suitable manner when it represents a glass cylinder whose two end surfaces are inclined relatively to its axis at 90° and 30°, respectively, and when there is ground into it a reflecting surface parallel to its axis. The ray exit surface of the body may be held by the tube that is to receive the eye-piece proper.

Figure 2:
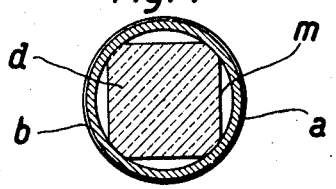

In the accompanying drawing, which represents a constructional example of the ocular tube attachment according to the invention, Figure 1 illustrates this attachment in central sectional elevation and Figure 2, in a section through line A—A in Figure 1.

The ocular tube attachment has a cylindrical tube $a$ the lower end of which is closed by means of a cover $b$ screwed to it and having an aperture $c$ for the passage of light. The tube $a$ contains a prism body $d$ representing a column of square cross-sectional area. The longitudinal edges of this column are rounded off so as to provide parts of a circle whose radius is equal to that of the hollow space in the tube $a$, the rounded edges making the prism body $d$ rest against the tube $a$. The lower end of the column is bounded by a surface $e$ at right angles to the longitudinal axis and resting on the cover $b$. At the upper end of the prism body $d$ is a surface $f$ inclined at 30° relatively to the longitudinal axis. Above, the tube $a$ terminates to a hemispherical part $g$ into which a tube $h$, the ocular tube proper, is so fitted, and screwed by means of a screw $i$, as to assume an inclined position. The lower end of the tube $h$ is in contact with the inclined surface $f$ of the prism body $d$. The tube $h$ is inclined in such a way that its axis is at right angles to the surface $f$. Outside, the tube $a$ has a surface $k$ that makes it fit into the microscope tube $l$, which is indicated by dash-lines in Figure 1.

When using the ocular tube attachment, the cylindrical part $a$ is introduced into the microscope tube $l$, the surface $k$ providing the centering. The greater portion of the tube $a$ extending into the tube $l$, also the prism body $d$ is in this tube $l$, only the hemispherical part $g$ and the tube $h$ protruding therefrom. Being provided as it is in the tube $h$ in the known manner, the microscope eye-piece is given a convenient position for the microscopist's eye. The imaging rays traverse the aperture $c$, they enter the prism body $d$ and are reflected by the inclined surface $f$. Subsequently thereto, the rays strike the largest surface $m$ of the prism body $d$. Where it is necessary, this prism surface $m$ is covered with a reflecting layer $n$ which deviates the imaging rays in the direction of the axis of the tube $h$. The prism body $d$ is of such a length that objectives corrected for the usual optical tube length may be used without the necessity of applying any additional negative lens. In other words, when using the ocular tube attachment, the optical tube length is not altered with respect to that of straight-vision microscopes.

I claim:

1. An ocular tube attachment for monocular microscopes, comprising an ocular tube, this tube being adapted to occupy the greater part of the length of the microscope tube, a glass body disposed in, and occupying the greater part of the length of, the said ocular tube, the glass body being adapted to receive light at its lower end and to provide that the light, subsequently to reflexion, leaves its upper end.

2. In an ocular tube attachment according to claim 1, the said glass body resting against the said ocular tube with those of its surfaces which are traversed by the rays and with some of its edges in which its other surfaces intersect each other.

3. An ocular tube attachment for monocular microscopes, comprising an ocular tube, this tube being adapted to occupy the greater part of the length of the microscope tube, a glass body disposed in, and occupying the greater part of the length of, the said ocular tube, the glass body being a cylinder whose end surfaces are inclined relatively to its axis at 90° and 30°, respectively, a reflecting surface parallel to its axis being ground into it.

4. In an ocular tube attachment according to claim 1, another tube adapted to receive an eyepiece and to hold the said glass body in position by resting against the light exit surface of this body.

WALTHER BAUERSFELD.